United States Patent
Li et al.

(10) Patent No.: US 10,330,992 B2
(45) Date of Patent: Jun. 25, 2019

(54) DISPLAY DEVICE (71) Applicant: BOE TECHNOLOGY GROUP CO., LTD., Beijing (CN)

(72) Inventors: Wenbo Li, Beijing (CN); Pan Li, Beijing (CN); Jianbo Xian, Beijing (CN); Hongfei Cheng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 661 days.

(21) Appl. No.: 14/891,518

(22) PCT Filed: May 11, 2015

(86) PCT No.: PCT/CN2015/078671
§ 371 (c)(1),
(2) Date: Nov. 16, 2015

(87) PCT Pub. No.: WO2016/110032
PCT Pub. Date: Jul. 14, 2016

(65) Prior Publication Data
US 2018/0188615 A1    Jul. 5, 2018

(30) Foreign Application Priority Data
Jan. 7, 2015    (CN) .................... 2015 2 0010568 U (51) Int. Cl.
*G02F 1/1343* (2006.01)
*G02F 1/1345* (2006.01)
(Continued)

(52) U.S. Cl.
CPC ...... *G02F 1/134336* (2013.01); *G02F 1/1345* (2013.01); *G02F 1/134309* (2013.01);
(Continued)

(58) Field of Classification Search
CPC ............................................... G02F 1/134336
See application file for complete search history.

(56) References Cited

U.S. PATENT DOCUMENTS

2005/0052594 A1* 3/2005 Lee ................... G02F 1/133382
349/110
2008/0284928 A1* 11/2008 Sakamoto ......... G02F 1/133555
349/37
(Continued)

FOREIGN PATENT DOCUMENTS

CN    101308293 A    11/2008
CN    101636690 A    1/2010
(Continued)

OTHER PUBLICATIONS

Search Report and Written Opinion dated Sep. 24, 2015 from State Intellectual Property Office of the P.R. China.

*Primary Examiner* — Sang V Nguyen
(74) *Attorney, Agent, or Firm* — Dilworth & Barrese, LLP.; Michael J. Musella, Esq.

(57) ABSTRACT

A display device is disclosed. The display device includes a first substrate (S1) and a second substrate (S2) provided oppositely, and a plurality of sub-pixels (P) arranged in a matrix, wherein the sub-pixels at least include first subordinate sub-pixels and second subordinate sub-pixels; the first substrate is provided with a plurality of common electrodes (Com1, Com2), the first subordinate sub-pixel and the second subordinate sub-pixel of a same sub-pixel (P) respectively correspond to different common electrodes, and the common electrodes corresponding thereto are respectively connected with different external common voltage signal (H); and the second substrate is provided with a plurality of common electrode lines (Com'1, Com'2), the first subordinate sub-pixel and the second subordinate sub-pixel of a same sub-pixel respectively correspond to different common electrode lines, and the common electrode lines corresponding thereto are electrically connected with the common electrodes corresponding thereto, respectively.

14 Claims, 9 Drawing Sheets (51) Int. Cl.
*G02F 1/1362* (2006.01)
*G09G 3/36* (2006.01)
*G02F 1/1339* (2006.01)

(52) U.S. Cl.
CPC ..... *G02F 1/136286* (2013.01); *G09G 3/3648* (2013.01); *G02F 1/1339* (2013.01); *G02F 2001/134345* (2013.01); *G02F 2201/121* (2013.01); *G09G 2300/0426* (2013.01)

(56) References Cited

U.S. PATENT DOCUMENTS

| | | | | |
|---|---|---|---|---|
| 2011/0170043 | A1* | 7/2011 | Lim | G02F 1/133512 349/116 |
| 2012/0206436 | A1* | 8/2012 | Nakata | G02F 1/134309 345/212 |
| 2013/0057815 | A1* | 3/2013 | Takano | G02F 1/134309 349/123 |
| 2013/0250198 | A1* | 9/2013 | Shimoshikiryoh | G09G 3/3648 349/39 |
| 2014/0132859 | A1* | 5/2014 | Yanase | G06F 3/0412 349/12 |
| 2014/0152935 | A1* | 6/2014 | Heo | G02F 1/1339 349/43 |
| 2014/0198267 | A1* | 7/2014 | Jeong | G06F 3/041 349/12 |

FOREIGN PATENT DOCUMENTS

| | | | |
|---|---|---|---|
| CN | 103189791 A | 7/2014 | |
| CN | 204065625 U | 12/2014 | |
| CN | 204302636 U | 4/2015 | |
| JP | 2009-223167 | * 10/2009 | ............ G02F 1/133 |
| JP | 2009223167 A | 10/2009 | |

* cited by examiner

DISPLAY DEVICE

TECHNICAL FIELD

Embodiments of the present disclosure relate to a display device.

BACKGROUND

Liquid crystal display devices are the predominated display devices and are widely used in various applications. For a common liquid crystal display device, it mainly includes an array substrate and a color film substrate provided oppositely and liquid crystal packaged therebetween. The array substrate includes a pixel electrode and a common electrode line provided corresponding to the pixel electrode thereon, and the pixel electrode and the common electrode line form storage capacitance, for retaining display of a picture of a previous frame when the picture is switched between two frames. The color film substrate includes a common electrode thereon for forming electrical field with the pixel electrode to control the deflection of the liquid crystal molecules.

SUMMARY

The embodiments of the present disclosure provide a display device. The display device includes a first substrate and a second substrate provided oppositely; a plurality of sub-pixels arranged in a matrix, wherein the sub-pixels at least include a first subordinate sub-pixel and a second subordinate sub-pixel, the first substrate includes a plurality of common electrodes, a first subordinate sub-pixel and a second subordinate sub-pixel of a same sub-pixel respectively correspond to different common electrodes, and the common electrodes corresponding to the first subordinate sub-pixel and the second subordinate sub-pixel of the same sub-pixel are respectively connected to different external common voltage signals; the second substrate includes a plurality of common electrode lines, the first subordinate sub-pixel and the second subordinate sub-pixel of the same sub-pixel respectively correspond to different common electrode lines, and the common electrode lines corresponding to the first subordinate sub-pixel and the second subordinate sub-pixel of the same sub-pixel are electrically connected to the common electrodes corresponding to the first subordinate sub-pixel and the second subordinate sub-pixel belonging of the same sub-pixel, respectively.

Optionally, the common electrodes include first common electrodes and second common electrodes, the first common electrodes are connected with external first common voltage signal, the second common electrodes are connected with external second common voltage signal; and the common electrode lines include first common electrode lines and second common electrode lines, the first common electrode lines are connected with the first common electrodes, and the second common electrode lines are connected with the second common electrodes.

Optionally, the first common electrodes and the second common electrodes are alternately arranged, and the first subordinate sub-pixels correspond to the first common electrodes, and the second subordinate sub-pixels correspond to the second common electrodes.

Optionally, the first common electrode lines and the second common electrode lines are alternately arranged, and the first subordinate sub-pixels correspond to the first common electrode lines, and the second subordinate sub-pixels correspond to the second common electrode lines.

Optionally, the first common electrodes and the second common electrodes are alternately arranged, adjacent first subordinate sub-pixel and second subordinate sub-pixel of different sub-pixels correspond to a same first common electrode or correspond to a same second common electrode.

Optionally, the first common electrode lines and the second common electrode lines are alternately arranged, adjacent first subordinate sub-pixel and second subordinate sub-pixel of different sub-pixels correspond to a same first common electrode line or correspond to a same second common electrode line.

Optionally, the first common electrode line and the second common electrode line are periodically arranged in an order of two first common electrode lines, two second electrode lines, adjacent first subordinate sub-pixel and second subordinate sub-pixel of different sub-pixels respectively correspond to two adjacent first common electrode lines or respectively correspond to two adjacent second common electrode lines; and the two adjacent first common electrode lines are respectively connected with a same first common electrode, the two adjacent second common electrode lines are respectively connected with a same second common electrode.

Optionally, the first common electrode lines and the second common electrode lines are periodically arranged in an order of two first common electrode lines and two second electrode lines, adjacent first subordinate sub-pixel and second subordinate sub-pixel of different sub-pixels respectively correspond to two adjacent first common electrode lines, or respectively correspond to two adjacent second common electrode lines; and the two adjacent first common electrode lines are electrically connected through a first connection electrode therebetween, and one of the first common electrode lines is electrically connected with the first common electrode, the two adjacent second common electrode lines are electrically connected through a second connection electrode therebetween, and one of the second common electrode lines is electrically connected with the second common electrode.

Optionally, the first common electrode lines and the second common electrode lines are periodically arranged in an order of two first common electrode lines and two second electrode lines, adjacent first subordinate sub-pixel and second subordinate sub-pixel of different sub-pixels respectively correspond to two adjacent first common electrode lines or respectively correspond to two adjacent second common electrode lines; and the two adjacent first common electrode lines both are electrically connected with a first signal line through a first connection electrode, and the first signal line is electrically connected with the first common electrode, the two adjacent second common electrode lines both are electrically connected with a second signal line through a second connection electrode, and the second signal line is electrically connected with the second common electrode.

Optionally, each row of the sub-pixels include two rows of subordinate sub-pixels, and the first row of the subordinate sub-pixels include a plurality of first subordinate sub-pixels, and the second row of the subordinate sub-pixels include a plurality of second subordinate sub-pixels, and the common electrodes and the common electrode lines are laterally extended, a row of the subordinate sub-pixels correspond to a common electrode and a common electrode line.

Optionally, sealant is provided between the first substrate and the second substrate, and positions at which the common electrode lines are electrically connected with the common electrodes are located at a side of the sealant facing a pixel region or located inside the sealant.

Optionally, the common electrode and the common electrode line corresponding to the same subordinate sub-pixel are electrically connected through conductive gold balls, conductive silver adhesive or indium tin oxide.

BRIEF DESCRIPTION OF THE DRAWINGS

Embodiments of the present invention will be described in more detail below with reference to the accompanying drawings to allow an ordinary skill in the art to understand the present invention more clearly, in which.

DETAILED DESCRIPTION

The technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by an ordinary skill in the art to which the present invention belongs. The terms, such as "first," "second" or the like, which are used in the description and the claims of the present application, are not intended to indicate any sequence, amount or importance, but for distinguishing various components. Also, the terms, such as "a/an," "one," "the/the" or the like, are not intended to limit the amount, but for indicating the existence of at lease one. The terms, such as "comprise/comprising," "include/including" or the like, are intended to specify that the elements or the objects stated before these terms encompass the elements or the objects and equivalents thereof listed after these terms, but not preclude other elements or objects. The terms, such as "On," "under," or the like, are only used to indicate relative position relationship, and when the position of the object which is described is changed, the relative position relationship may be changed accordingly.

The present inventor notices that the liquid crystal display device is disadvantage by its too narrow angle of view due to the optical anisotropy of the liquid crystal molecules. In order to achieve a wide angel of view, a technology is used, by which a plurality of domain regions are formed in each of sub-pixels to control the liquid crystal molecules in the different domain regions to be deflected to different extent at the same time so that compensation effect can be occurred between the plurality of domain regions. However, circuitry on an array substrate in the multi-domain regions display device is complicated, therefore, there is a high requirement to the processes, and large crosstalk often happens between different lines.

At least one embodiment of the present disclosure provides a display device including a first substrate and a second substrate provided oppositely and a plurality of sub-pixels arranged in a matrix. Each of the sub-pixels at least includes a first subordinate sub-pixel and a second subordinate sub-pixel. The first substrate is provided with a plurality of common electrodes, and the first subordinate sub-pixel and the second subordinate sub-pixel of a same sub-pixel respectively correspond to different common electrodes, and the common electrodes corresponding to the first subordinate sub-pixel and the second subordinate sub-pixel of the same sub-pixel are connected to different external common voltage signals, respectively. The second substrate is provided with a plurality of common electrode lines, the first subordinate sub-pixel and the second subordinate sub-pixel of a same sub-pixel respectively correspond to different common electrode lines, and the common electrode lines corresponding to the first subordinate sub-pixel and the second subordinate sub-pixel of the same sub-pixel are electrically connected with the common electrodes corresponding to the first subordinate sub-pixel and the second subordinate sub-pixel of the same sub-pixel.

In the display device as provided, by dividing each of the sub-pixels into at least the first subordinate sub-pixel and the second subordinate sub-pixel and by respectively setting different common electrodes and different common electrode lines to correspond to the first subordinate sub-pixel and the second subordinate sub-pixel so that at least two domain regions are formed in one sub-pixel, a wide viewing angle can be achieved. By electrically connecting the common electrode on the first substrate with the common electrode lines on the second substrate, and by connecting the common electrode with an external common voltage signal, power supply to the second substrate from the first substrate can be achieved, and the wirings originally provided on the second substrate for inputting the external common voltage signal are transferred to the first substrate, thus, the number of the wirings on the second substrate can be reduced, the difficulty of the process can be lowered down, and the crosstalk between the lines can be lowered. That is to say, with the display device provided by the present embodiment, a display of wide viewing angle with multi-domain regions can be achieved based on a simplified circuit structure.

The First Embodiment

As above described, in the display device provided by the present embodiment, each of the common electrodes include a first common electrode and second common electrode, the first common electrode is connected with an external first common voltage signal, the second common electrode is connected with an external second common voltage signal, the common electrode lines include first common electrode lines and second common electrode lines, the first common electrode lines are electrically connected with the first common electrodes, the second common electrode lines are electrically connected with the second common electrodes, and in the present embodiment, the subordinate sub-pixels, the common electrodes and the common electrode lines correspond to each other one by one.

Figure 1:
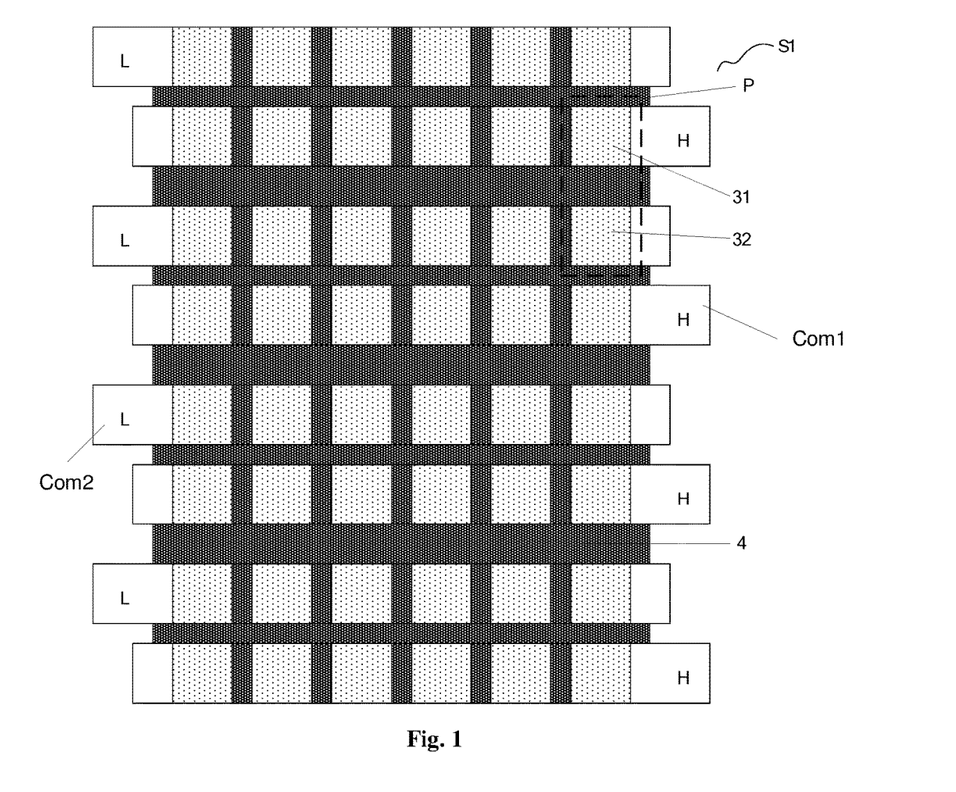
FIG. 1 is a plan view of a first substrate in a display device provided by a first embodiment of the present disclosure.
Figure 5:
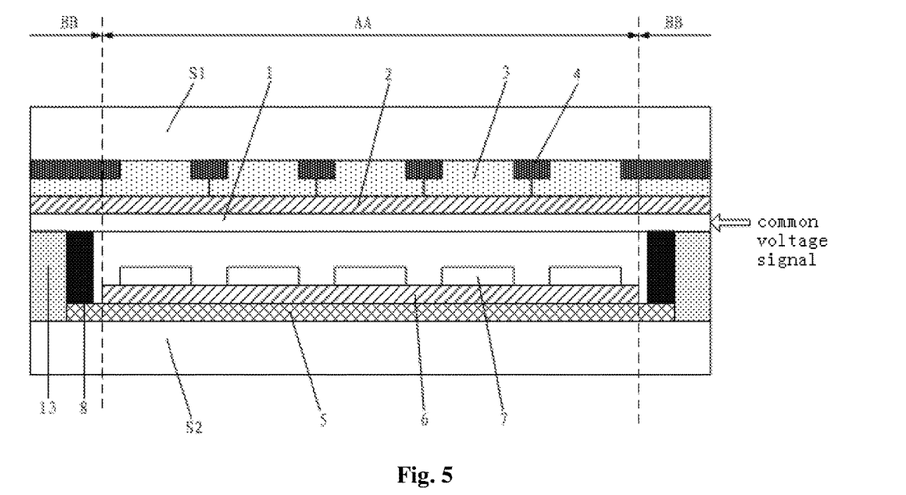
FIG. 5 is a cross sectional view of the display device provided by the embodiments of the present disclosure.

As shown in FIG. 1 and FIG. 5, on the first substrate S1, the first common electrodes Com1 and the second common electrodes Com2 included in the common electrodes 1 are alternately arranged, and the first common electrodes Com1 are connected with the external first common voltage signal H, and the second common electrodes Com2 are connected with the external second common voltage signal L. The first subordinate sub-pixels correspond to the first common electrodes Com1, and the second subordinate sub-pixels correspond to the second common electrodes Com2. For example, in a sub-pixel region P, the first common electrode Com 1 is overlapped with a first color resistor 31 corresponding to the first subordinate sub-pixel, and the second common electrode Com2 is overlapped with a second color resistor 32 corresponding to the second subordinate sub-pixel.

Figure 2:
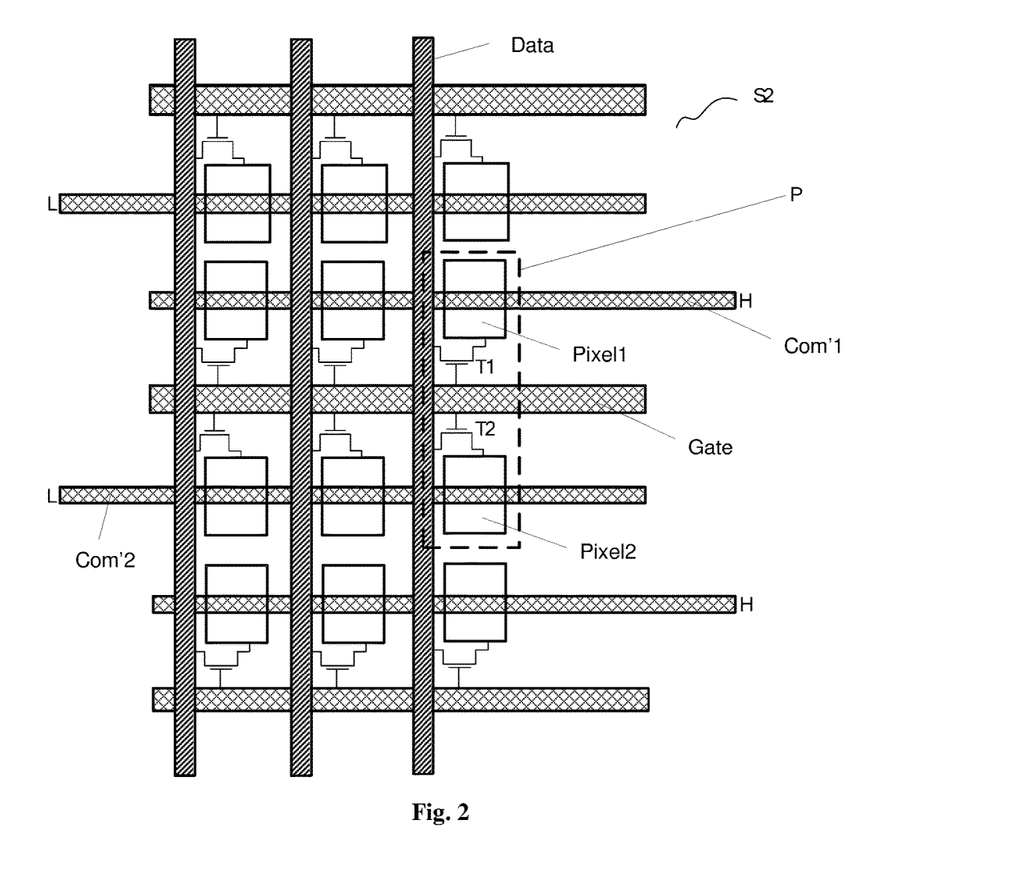
FIG. 2 is a plan view of a second substrate in the display device provided by the first embodiment of the present disclosure.

As shown in FIG. 2 and FIG. 5, in the second substrate S2, the first common electrode lines Com'1 and the second common electrode lines Com'2 included in the common electrode lines 5 are alternately arranged, the first common electrode lines Com'1 are electrically connected with the first common electrodes Com1, thus are supplied with the first common voltage signal H, and the second common electrode lines Com'2 are electrically connected with the second common electrodes Com2 and thus are supplied with the second common voltage signal L. The first subordinate sub-pixels correspond to the first common electrode lines Com'1, and the second subordinate sub-pixels correspond to the second common electrode lines Com'2. For example, in a sub-pixel region P, the first common electrode line Com'1 is overlapped with a first pixel electrode Pixel1 corresponding to the first subordinate sub-pixel, and the second common electrode line Com'2 is overlapped with a second pixel electrode Pixel2 corresponding to the second subordinate sub-pixel.

In an example, in the display device provided by the present embodiment, each row of the sub-pixels may include two rows of subordinate sub-pixels, and the first row of the subordinate sub-pixels include a plurality of first subordinate sub-pixels, and the second row of the subordinate sub-pixels include a plurality of second subordinate sub-pixels. The common electrodes 1 and the common electrode lines 5 are extended laterally. One row of the subordinate sub-pixels correspond to one common electrode and one common electrode line, thus a single common electrode 1 and common electrode line 5 can be made to correspond to one or more rows of the subordinate sub-pixels, and the structure of the substrate can be simplified.

It is to be noted that in order to form at least two domain regions in one sub-pixel, the second substrate S2 further includes a plurality of pixel electrodes 7 including the first pixel electrodes Pixel1 and the second pixel electrodes Pixel2, wherein the first subordinate sub-pixels correspond to the first pixel electrodes Pixel1 and the second subordinate sub-pixels correspond to the second pixel electrodes Pixel2; a plurality of switch transistors including first switch transistors T1 and second switch transistors T2, wherein the first subordinate sub-pixels correspond to the first switch transistors T1 and the second subordinate sub-pixels correspond to the second switch transistors T2; and a plurality of gate lines Gate, wherein the first subordinate sub-pixel and the second subordinate sub-pixel of a same sub-pixel may correspond to a same gate line, that is, the first subordinate sub-pixel and the second subordinate sub-pixel of the same sub-pixel may be controlled by the same gate line Gate; alternatively, the first subordinate sub-pixel and the second subordinate sub-pixel of the same sub-pixel correspond to two gate lines, respectively, these two gate lines are supplied with gate driving signals at the same time so that the first subordinate sub-pixel and the second subordinate sub-pixel of the same sub-pixel can be switched on or off simultaneously.

As shown in FIG. 1, after the first substrate S1 is disposed oppositely with the second substrate S2, in a sub-pixel region P, an electrical field is established between the first common electrode Com1 located on the first substrate S1 and corresponding to the first subordinate sub-pixel and the first pixel electrode Pixel1 located on the second substrate S2, and a storage capacitor is formed between the first common electrode line Com'1 and the first pixel electrode Pixel1 on the second substrate S2; and an electrical field is established between the second common electrode Com2 located on the first substrate S1 and corresponding to the second subordinate sub-pixel and the second pixel electrode Pixel2 located on the second substrate S2, and a storage capacitor is formed between the second common electrode line Com'2 and the second pixel electrode Pixel2 on the second substrate S2. The first common voltage signal H applied on the first common electrode Com1 and the second common voltage signal L applied on the second common electrode Com2 are different, and the first common voltage signal H applied on the first common electrode line Com'1 and the second common voltage signal L applied on the second common electrode line Com'2 are different, the electrical field and the storage capacitance formed in the first sub-pixel is different from those in the second sub-pixel, thus two domain regions are formed in one sub-pixel, and the formed two domain regions compensate for each other to achieve a display with wide viewing angle.

It is to be noted that the position of the common electrodes are not limited by the present embodiment, as long as the electrical field can be formed with the corresponding pixel electrode. For example, the common electrodes can be made to cover all the subordinate sub-pixel regions so as to more comprehensively control the deflection of the liquid crystal molecules in the corresponding regions. Moreover, the position of the common electrode lines is not limited by the present embodiment, as long as the storage capacitor can be formed with the corresponding pixel electrodes. For example, the common electrode lines can be made to extend across the subordinate sub-pixel regions, so as to increase the facing area between the common electrode lines and the pixel electrodes to increase the storage capacitance. The common electrode lines may also be disposed at the edge of the subordinate sub-pixel regions, and are only partially overlapped with the pixel electrodes, so as to decrease the influence on the light transmittance. The common electrode lines may also be disposed at the peripheral of the subordinate sub-pixel regions (e.g. being provided between two rows of pixel electrodes), and are not overlapped with the pixel electrodes, to thoroughly eliminate the influence on the light transmittance.

In the present embodiment, the structure of the display device is described in the context of the structure in which two domain regions are formed in one sub-pixel. Based on the present embodiment, variation to the structure of the display device in the present embodiment can be made by the person skilled in the art to obtain a three-domain region, a four-domain region, or multi-domain regions structure. It can be achieved by respectively providing the common electrodes and the common electrode lines at different potential to correspond to the different domain regions while providing the corresponding pixel electrodes and switch transistors, thus the three-domain region, four-domain region, and multi-domain region structure will not be further described.

It is to be noted that the common electrode lines in the first substrate and the common electrodes in the second substrate can be electrically connected at a position which is provided in a display region and/or a peripheral region after the first substrate is assembled with the second substrate, for example, outside of the sealant. The position can be varied as necessary.

Figure 6A:
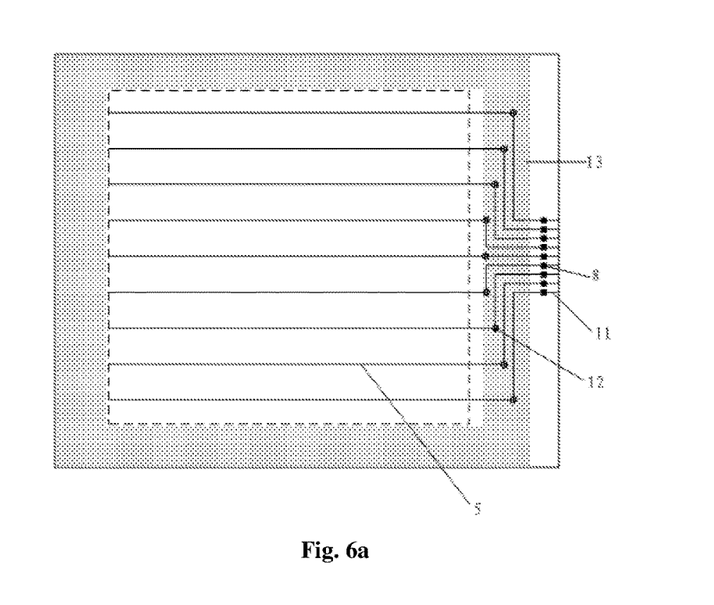
FIG. 6a is a plan view of wiring of common electrode lines on an array substrate.

In an embodiment, as shown in FIG. 6a, the common voltage signal can be supplied from a side of the array substrate. Peripheral wirings 11 shall be prepared at the ends of the common electrode lines 5 and are connected with the common electrode lines 5 through vias 12 so as to connect the peripheral wirings 11 with the external common voltage signal, to achieve the supply of the common voltage signal. And the peripheral wirings 11 can be connected with the common electrodes on the color film substrate by using a conductive member 8, so as to achieve the input of the common voltage signal in the color film substrate. Due to the provision of the peripheral wirings 11, vias 12, and the like, the structure of the array substrate becomes complex, and since the common electrode lines on the array substrate and the common electrodes on the color film substrate are electrically connected with conductive member 8 through the peripheral wirings 11, a portion of the peripheral wirings 11 and the conductive members 8 is exposed outside of the sealant, hindering the protection of the peripheral wirings 11 and conductive member 8, and leading to the degradation of the conductive performance over time.

Figure 6B:
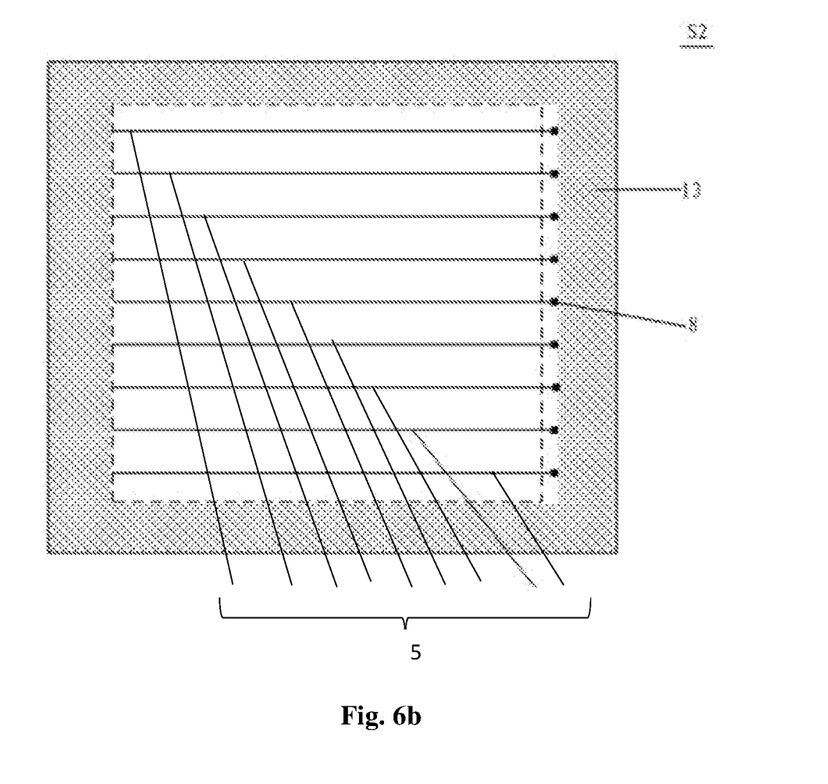
FIG. 6b is a plan view of the wiring of the common electrode lines on the second substrate in the display device provided by the first embodiment of the present disclosure.

As shown in FIG. 6b and FIG. 5, in the present embodiment, the common voltage signals (including the first common voltage signal H and the second common voltage signal L) are supplied from the first substrate S1, so that the common electrodes 1 on the first substrate S1 are at a certain potential, and the common electrodes 1 are electrically connected with the ends of the common electrode lines 5 on the second substrate S2 at a bezel region BB, so that the common electrode lines 5 are also at the same potential, achieving the supply of the common voltage signal from a side of the first substrate S1. The peripheral wirings 11 for connecting the external common voltage signal are transferred from the second substrate S2 onto the first substrate S1. The number of the wirings on the second substrate S2 is reduced, and the step for forming vias for electrically connecting the peripheral wirings 11 and the common electrode lines 5 can be omitted. The process difficulty can be lowered down, and the crosstalk between the wirings can also be lowered. Moreover, since the peripheral wirings 11 for connecting the external common voltage signal are omitted from the second substrate S2, in the present embodiment, the common electrode lines 5 and the common electrodes can be connected at a position which is at a side of the sealant 13 facing the pixel region or is inside of the sealant 13. For example, by providing the conductive members 8 directly inside of the sealant or within the sealant 13, to connect the common electrode lines 5 with the common electrodes on the first substrate S1, the conductive members 8 can be protected in the sealant 13, which can avoid the degradation of the conductive performance due to exposing to the ambient environment.

In the present embodiment, the common electrode and the common electrode lines corresponding to the same subordinate sub-pixel are electrically connected by using the conductive members 8, and the conductive members 8 can be a conductive gold ball, conductive silver adhesive, indium tin oxide, or the like, to reduce connection resistance between the common electrodes and the common electrode lines. In addition, the common electrodes 5 on the first substrate S1 may be connected with an external flexible printed circuit board (FPC) or the like, to obtain the common voltage signal.

It is to be noted that in the display device provided by the present embodiment, the first substrate S1 may be a color film substrate, in addition to the common electrodes 1, the first substrate may also include a black matrix 4, a color film layer 3 (including a first color resistor 31 and a second color resistor 32), and an optical adhesive layer 2, etc. The second substrate S2 may be an array substrate, and may include common electrode lines 5, gate lines Gate, switch resistors, an insulating layer 6, the pixel electrodes 7, or the like. The common electrode lines 5 may be formed in a same patterning process as the gate lines Gate, to reduce the times of the patterning processes, so as to simplify the process steps. In order to shield the common electrode lines 5, the black matrix can also be disposed at a corresponding position on the first substrate S1.

In addition, in FIG. 1 and FIG. 2, in order to more clearly illustrate the corresponding relationship of the first common electrode Com1, the second common electrode Com2, the first pixel electrode Pixel1, and second pixel electrode Pixel2 with the subordinate sub-pixels, the first common electrode Com1, the second common electrode Com2, the first pixel electrode Pixel1 and the second pixel electrode Pixel2 are processed to be transparent, and in fact, the first common electrode Com1, the second common electrode Com2, the first pixel electrode Pixel1 and the second pixel electrode Pixel2 may be transparent electrodes.

The Second Embodiment

In the display device provided by the present embodiment, the common electrodes include first common electrodes and second common electrodes, the first common electrodes are connected with external first common voltage signal, and the second common electrodes are connected with external second common voltage signal. Common electrode lines include first common electrode lines and second common electrode lines. The first common electrodes are electrically connected with the first common electrodes, and the second common electrode lines are electrically connected with the second common electrodes. Two adjacent rows of subordinate sub-pixels belonging to different row of sub-pixels commonly use a same common electrode, and the structure of the substrate can be further simplified.

Figure 3:
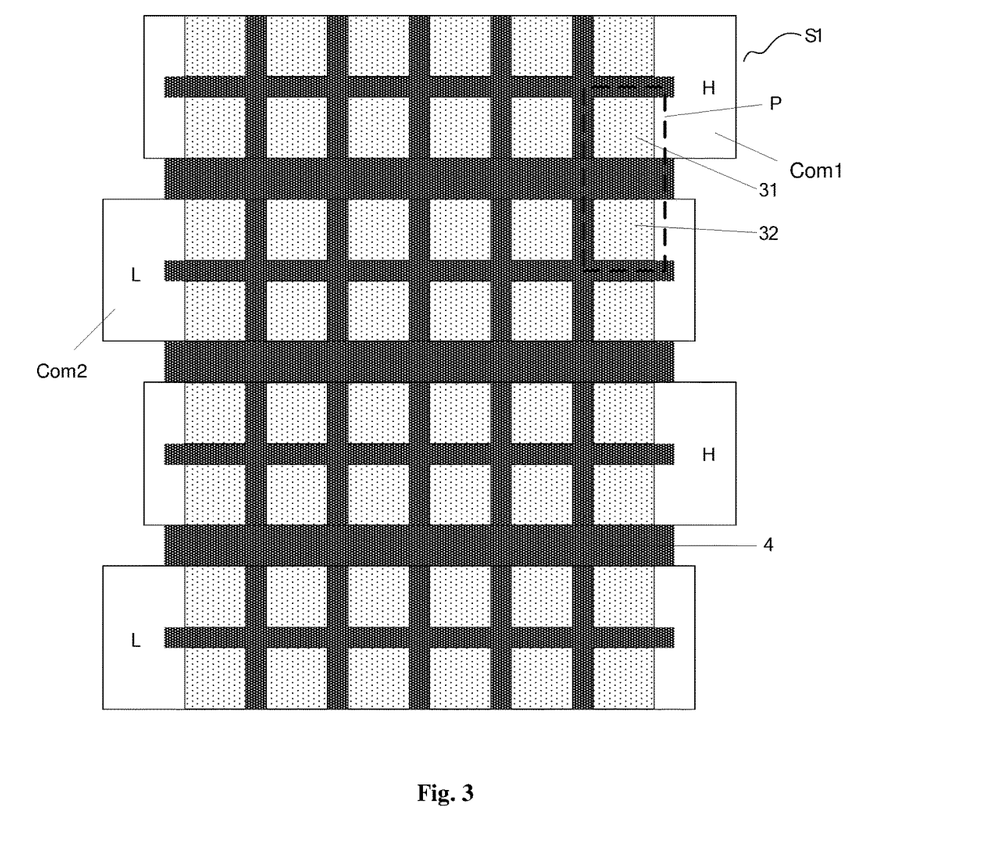
FIG. 3 is a plan view of a first substrate in a display device provided by a second embodiment of the present disclosure.

As shown in FIG. 3 and FIG. 5, in the first substrate S1, the first common electrodes Com1 and the second common electrodes Com2 included in the common electrodes 1 are arranged alternately. The first common electrodes Com1 are connected with the external first common voltage signal H. The second common electrodes Com2 are connected with the external second common voltage signal L. Two adjacent first subordinate sub-pixel and second subordinate sub-pixel of different sub-pixels correspond to a same first common electrode Com1 or correspond to a same second common electrode Com2. For example, in the $n^{th}$ sub-pixel region P of a column of sub-pixels, a lower half portion of the first common electrode Com1 is overlapped with the first color resistor 31 corresponding to the first subordinate sub-pixel of the $n^{th}$ sub-pixel (at this time, an upper half portion of the first common electrode Com1 is overlapped with the second color resistor 32 corresponding to the second subordinate sub-pixel of the $(n-1)^{th}$ sub-pixel), an upper half portion of the second common electrode Com2 is overlapped with the second color resistor 32 corresponding to the $n^{th}$ sub-pixel of the second subordinate sub-pixel (at this time, a lower half portion of the second common electrode Com2 is overlapped with the first color resistor 31 corresponding to the first subordinate sub-pixel of the $(n+1)^{th}$ sub-pixel). For the first substrate S1 having the above structure, four kinds of structures for the second substrate S2 are provided by the present embodiment.

Figure 4A:
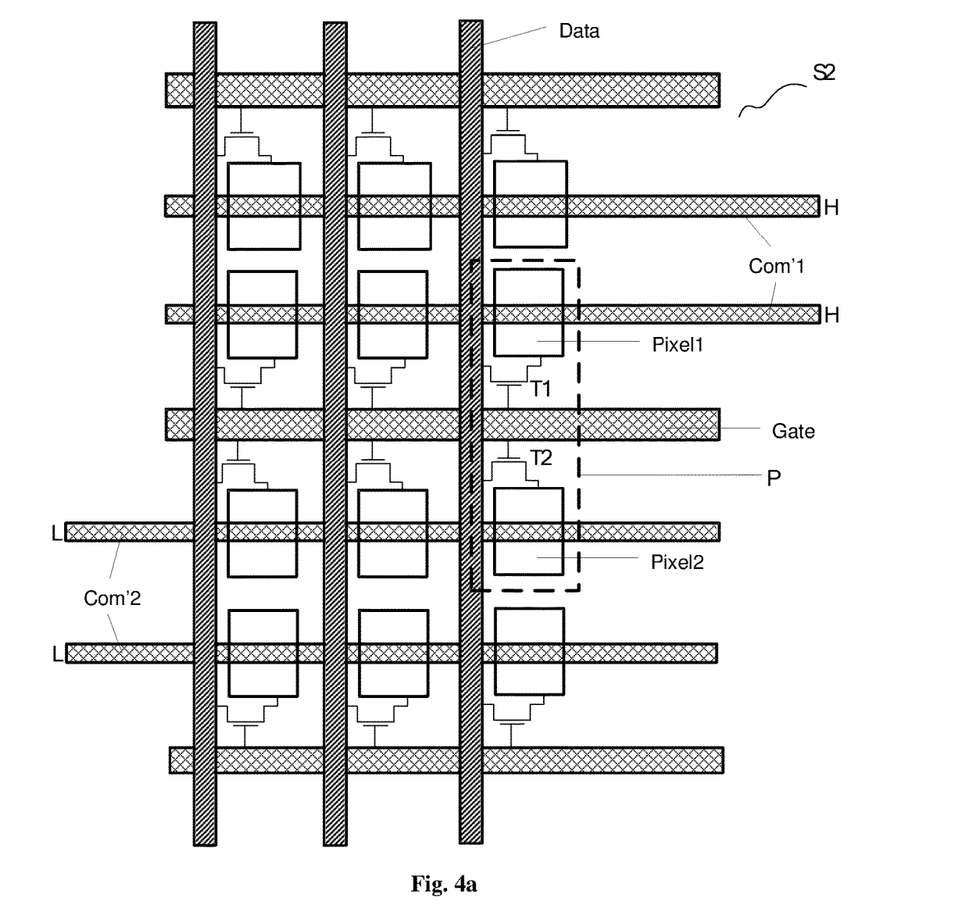
FIG. 4a is a plan view of a first structure of a second substrate in the display device provided by the second embodiment of the present disclosure.
Figure 4B:
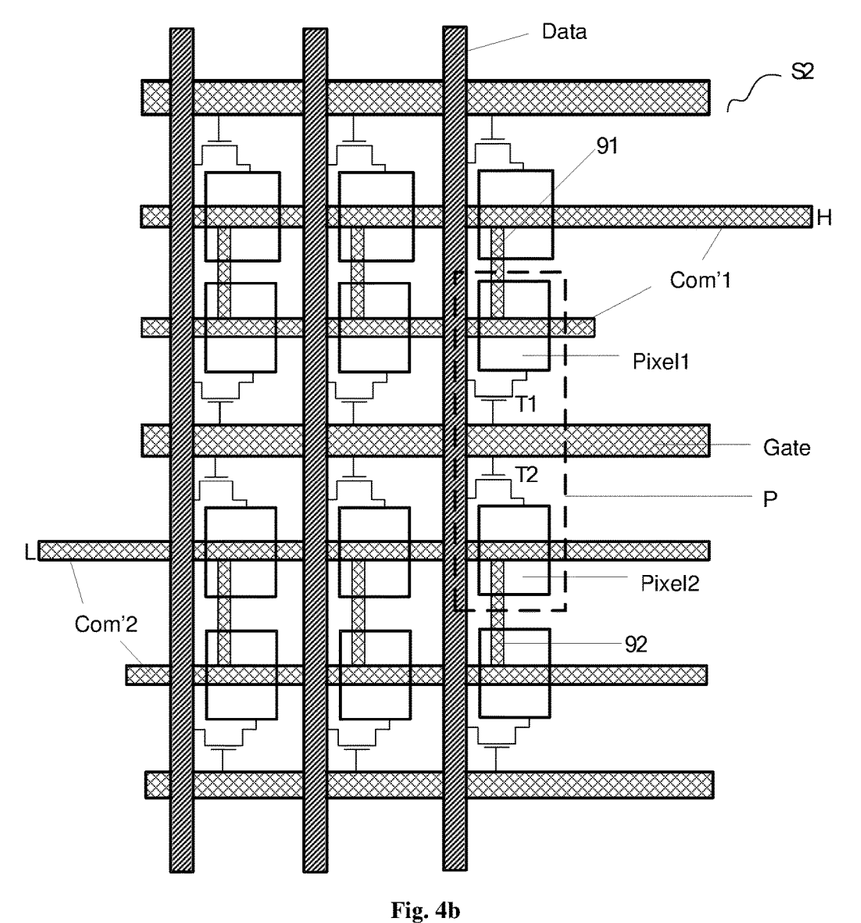
FIG. 4b is a plan view of a second structure of the second substrate in the display device provided by the second embodiment of the present disclosure.
Figure 4C:
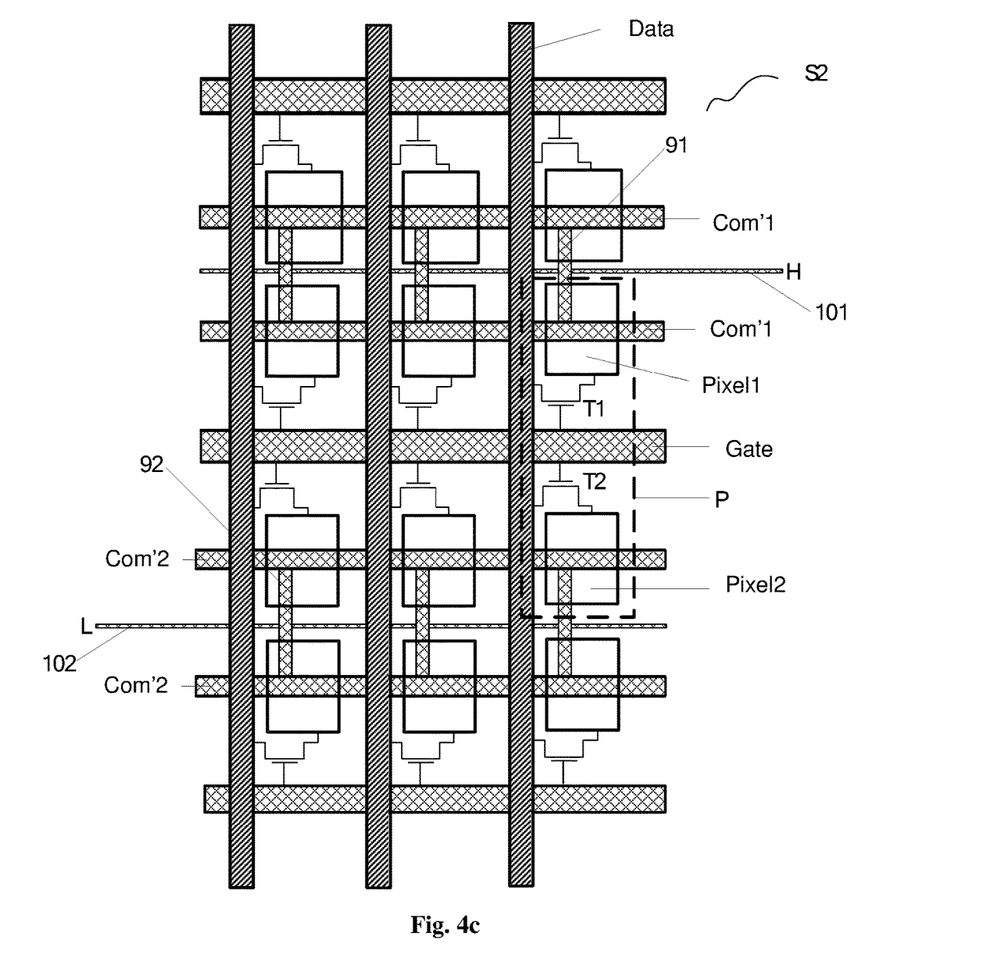
FIG. 4c is a plan view of a third structure of the second substrate in the display device provided by the second embodiment of the present disclosure.

As shown in FIG. 4a, FIG. 4b and FIG. 4c, in the second substrate S2 with the first, second and third structure, the common electrode line Com'1 and the second common electrode line Com'2 are periodically arranged in an order of two first common electrode lines Com'1 and two second common electrode lines Com'2, two adjacent first subordinate sub-pixel and second subordinate sub-pixel belonging to different sub-pixels respectively correspond to two adjacent first common electrode lines Com'1 or respectively correspond to two adjacent second common electrode lines Com'2. For example, in the $n^{th}$ sub-pixel region of a column of sub-pixels, the first common electrode line Com'1 is overlapped with the first pixel electrode Pixel1 corresponding to the first subordinate sub-pixel of the $n^{th}$ sub-pixel (in this case, a first common electrode line Com'1 adjacent to the first common electrode line Com'1 is overlapped with the second pixel electrode Pixel2 corresponding to the second subordinate sub-pixel of the $(n-1)^{th}$ sub-pixel). The second common electrode line Com'2 is overlapped with the second pixel electrode Pixel2 corresponding to the second subordinate sub-pixel of the $n^{th}$ sub-pixel (in this case, a second common electrode line Com'2 adjacent to said second common electrode line Com'2 is overlapped with the first pixel electrode Pixel1 corresponding to the first subordinate sub-pixel of the $(n+1)^{th}$ Com'1 sub-pixel).

For example, in the second substrate S2 with the first, second and third structure, the manners by which the common electrode lines 5 are connected with the common electrodes 1 are different from each other.

As shown in FIG. 4a, in the second substrate S2 with the first structure, two adjacent first common electrode lines Com'1 are connected with a same first common electrode Com1, respectively, so that the first common electrodes Com1 individually apply a first common voltage signal H to two adjacent first common electrode lines Com'1, respectively; two adjacent second common electrode lines Com'2 are electrically connected with a same second common electrode Com2, respectively, so that the second common electrode Com2 individually apply a second common voltage signal L to two adjacent second common electrode lines Com'2, respectively.

As shown in FIG. 4b, in the second substrate S2 with the second structure, two adjacent first common electrode lines Com'1 are electrically connected through a first connection electrode 91, one of the first common electrode lines Com'1 is electrically connected with the first common electrodes Com1, so that the first common electrodes Com1 can directly apply a first common voltage signal H to one of the first common electrode lines Com'1 connected thereto, the provided first common voltage signal H is transferred to another first common electrode line Com'1 through the first connection electrode 91; two adjacent second common electrode lines are electrically connected through a second connection electrode, one of the second common electrode lines is electrically connected with the second common electrodes, so that the second common electrodes Com2 can directly apply a second common voltage signal L to one of the second common electrode lines Com'2 connected thereto, and the provided second common voltage signal L is transferred to another second common electrode line com'2 through the second connection electrode 92. By providing the connection electrodes (including the first connection electrode 91 and the second connection electrode 92) to connect the two common electrode lines together, and by further electrically connecting one of the common electrode lines with the common electrodes, the number of the peripheral wirings for leading out the common electrode lines and connecting the common electrodes is reduced by half, and the structure of the circuitry on the substrate can be further simplified.

It is to be noted that the connection electrodes may only connect the two common electrode lines at the ends of the two common electrode lines, or may be distributed between the two common electrode lines at an equal distance so that the signals on the common electrode lines are consistently delayed; furthermore, the connection electrodes may provided between two adjacent data lines Data, respectively, to further allow the common voltage signal in each of the sub-pixels to be delayed consistently. The connection electrodes may be provided adjacent to the data lines Data, to be hidden below the black matrix for shielding the data lines Data as much as possible, to avoid the influence on the pixel transmittance. In addition, the connection electrodes may be formed in a same patterning process as the common electrode lines, the gate lines Gate, to simplify the manufacturing steps of the substrate.

As shown in FIG. 4c, in the second substrate S2 with the third structure, two adjacent first common electrode lines Com'1 are electrically connected with a first signal line 101 through a first connection electrode 91, and the first signal line 101 is electrically connected with the first common electrodes Com1, so that the first common electrodes Com1 can symmetrically transfer a first common voltage signal H to the first common electrode lines Com'1 at both sides by supplying the first common voltage signal H to the first signal line 101; two adjacent second common electrode lines Com'2 both are electrically connected with a second signal line 102 through a second connection electrode 92, the second signal line is connected with the second common electrodes, so that the second common electrodes Com2 can symmetrically transfer a second common voltage signal L to the second common electrode lines Com'2 at both sides by supplying the second common voltage signal L to the second signal line 102. By providing the signal lines (including the first signal line 101 and the second signal line 102) and the connection electrodes to electrically connect the common electrode lines together, and by electrically connecting the signal lines with the common electrodes, the number of the peripheral wirings on the second substrate S2 for leading out the common electrode lines to connect the common electrodes is reduced by half so as to simplify the structure of the circuitry on the substrate, and the common voltage signal can be input symmetrically, which is helpful to improve the consistence of the signal delay.

It is to be noted that the signal lines and the connection electrodes can be made in a same patterning process as the common electrode lines and the gate lines Gate, so that the manufacturing steps for the substrate can be simplified.

In addition, based on the first, second and third structure of the second substrate S2 provided by the present embodiment, in other embodiments of the present disclosure, the first common electrodes Com1 and the second common electrodes Com2 on the first substrate S1 can be periodically arranged in an order of two first common electrodes Com1 and two second common electrodes Com2, and adjacent first subordinate sub-pixel and the second subordinate sub-pixel of different sub-pixels correspond to two adjacent first common electrodes Com1, respectively, or correspond to two adjacent second common electrode Com2, respectively. For the manner by which the common electrodes are connected with the external common voltage signal, it can be refer to the manner for connecting the common electrode lines with the common electrodes in the first, second and third structure of the second substrate S2. For example, two adjacent first common electrodes Com1 can be connected with an external first common voltage signal H, respectively, and two adjacent second common electrodes Com2 can be connected with an external second common voltage signal L, respectively; alternatively, a first connection electrode can be firstly used to electrically connect the two adjacent first common electrodes Com1 together, and then one of the first common electrodes Com1 is connected with an external first common voltage signal H, and a second connection electrode can be used to electrically connect the two adjacent second common electrodes Com2 together, and then one of the second common electrodes Com2 is connected with an external second common voltage signal L, and the first connection electrode and the second connection electrode can be formed in a same layer as the common electrodes; alternatively, a first signal line can be provided between two adjacent first common electrodes Com1 firstly, a first connection electrode can be used to electrically connect the two adjacent first common electrodes Com1 with the signal line, then the first signal line is connected with an external first common voltage signal H, a second signal line is provided between two adjacent second common electrodes Com2, and a second connection electrode can be used to electrically connect the two adjacent common electrodes Com2 together, and then the second signal line is connected with an external second common voltage signal L, the first signal line, the second signal line, the first connection electrode and the second connection electrode can be formed in same layer as the common electrodes.

Figure 4D:
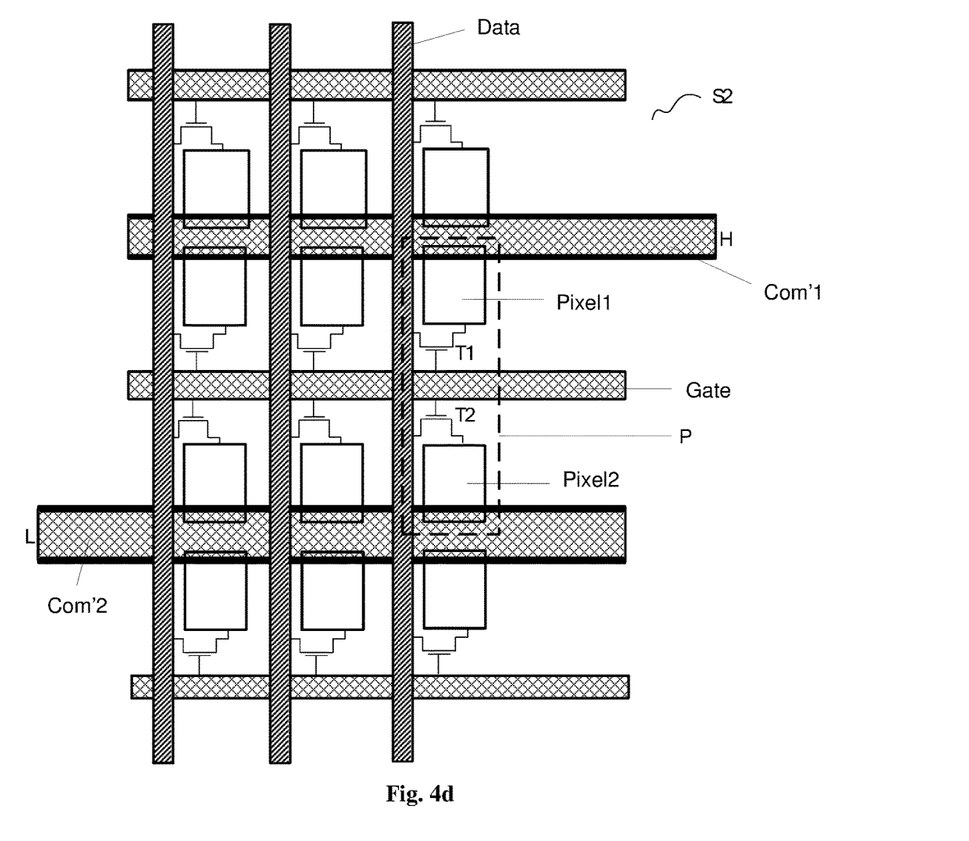
FIG. 4d is a plan view of a fourth structure of the second substrate in the display device provided by the second embodiment of the present disclosure.

As shown in FIG. 4d, in the second substrate S2 with the fourth structure, the first common electrode lines Com'1 and the second common electrode lines Com'2 are arranged alternately, adjacent first subordinate sub-pixels and second subordinate sub-pixels of different sub-pixels correspond to a same first common electrode line Com'1 or correspond to a same second common electrode line Com'2. For example, in a $n^{th}$ sub-pixel region of a column sub-pixels, a lower half portion of the first common electrode line is overlapped with the first pixel electrode Pixel1 corresponding to the first subordinate sub-pixel of the $n^{th}$ sub-pixel (in this case, an upper half portion of the first common electrode line is overlapped with the second pixel electrode Pixel2 corresponding to the second subordinate sub-pixel of the $(n-1)^{th}$ sub-pixel), an upper half portion of the second common electrode line Com'2 is overlapped with the second pixel electrode Pixel2 corresponding to the second subordinate sub-pixel of the $n^{th}$ sub-pixel (in this case, a lower half portion of the second common electrode line Com'2 is overlapped with the first pixel electrode Pixel1 corresponding to the first subordinate sub-pixel of the $(n+1)^{th}$ sub-pixel), so that adjacent first and second subordinate sub-pixels of different sub-pixels share a same common electrode line. The number of the common electrode lines can be reduced by half, and the circuitry structure on the second substrate S2 can be further simplified.

In an example, in the display device provided by the present embodiment, each row of the sub-pixels may include two rows of subordinate sub-pixels, the first row of subordinate sub-pixels include a plurality of first subordinate sub-pixels, and the second row of subordinate sub-pixels include a plurality of second subordinate sub-pixels. The common electrodes 1 and the common electrode lines 5 are extended laterally, and one row of the subordinate sub-pixels correspond to one common electrode and one common electrode lines, so that a single common electrode 1 and a single common electrode line 5 can be correlated with one or more rows of subordinate sub-pixels, and the structure of the substrate can be simplified.

It is to be noted that in order to correspondingly form at least two domain regions in one sub-pixel, the second substrate S2 may also include: a plurality of pixel electrodes 7 including first pixel electrodes Pixel1 and second pixel electrodes 2, wherein the first subordinate sub-pixels correspond to the first pixel electrodes Pixel1 and the second subordinate sub-pixels correspond to the second pixel electrodes Pixel2; a plurality of switch transistors including first switch transistors T1 and second switch transistors T2, wherein the first subordinate sub-pixels correspond to the first switch transistors T1 and the second subordinate sub-pixels correspond to the second switch transistors T2; and a plurality of gate lines Gate, wherein the first subordinate sub-pixel and the second subordinate sub-pixel of a same sub-pixel may correspond to a same gate line, that is, the first subordinate sub-pixel and the second subordinate sub-pixel of the same sub-pixel can be controlled by the same gate line Gate; or the first subordinate sub-pixel and the second subordinate sub-pixel of the same sub-pixel may correspond to two gate lines, respectively, these two gate lines are input gate driving signals at the same time, so that the first subordinate sub-pixel and the second subordinate sub-pixel of the same sub-pixel can be switched on or off simultaneously.

As provided by the present embodiment, the first substrate S1 and the second substrate S2 are disposed oppositely from each other, so that at least two domain regions can be formed in one sub-pixel, and a display with wide viewing angle can be achieved.

For example, as shown in FIG. 5, in the present embodiment, the common voltage signal is supplied from the first substrate S1, so that the peripheral wirings for connecting the external electrical signals can be transferred from the second substrate S2 onto the first substrate S1, the number of the wirings on the second substrate S2 can be reduced, and the process difficulty and the crosstalk between the wirings can be lowered down.

It is to be noted that, in FIG. 3, FIG. 4a, FIG. 4b, FIG. 4c and FIG. 4d, in order to more clearly illustrate the corresponding relationship of the first common electrodes Com1, the second common electrodes Com2, the first pixel electrodes Pixel1 and the second pixel electrodes Pixel2 with the subordinate sub-pixels, the first common electrodes Com1, the second common electrodes Com2, the first pixel electrodes Pixel1 and the second pixel electrodes Pixel2 are treated to be transparent, and in fact, the first common electrodes Com1, the second common electrodes Com2, the first pixel electrodes Pixel1 and the second pixel electrodes Pixel2 can be transparent electrodes.

In the display device provided by the present disclosure, each of the sub-pixels at least includes a first subordinate sub-pixel and a second subordinate sub-pixel, and the first subordinate sub-pixel and the second subordinate sub-pixel belonging to a same sub-pixel respectively correspond to different common electrodes and different common electrode lines, so that at least two domain regions can be formed in one sub-pixel, and a display with wide viewing angle can be achieved. The common electrodes on the first substrate are connected with the common electrode lines on the second substrate, and the common electrodes are connected with an external common voltage signal, so that power supply from the first substrate to the second substrate can be achieved, and the wirings originally provided on the second substrate for inputting the external common voltage signal can be transferred onto the first substrate. The number of the wirings on the second substrate can be reduced, and the process difficulty and the crosstalk between the wirings can be lowered down.

The above described are only exemplary embodiments of the present application, but not intended to limit the scope of the present invention. It is apparent that those skilled in the art can make various modifications and variations to the present invention without departing from the spirit and scope of the present invention, and it is intended that the present invention contains these modifications and variations that fall into the scope of the present invention. The scope of the present disclosure is defined in the Claims.

The present application claims the priority of a Chinese Patent Application No. 201520010568.1, filed on Jan. 7, 2015 and entitled with "Display Device", the disclosure of which is entirely incorporated herein by reference.

What is claimed is:

1. A display device including a color filter substrate and an array substrate provided oppositely, a liquid crystal layer provided therebetween, gate lines and data lines intersected with each, and a plurality of sub-pixels arranged in a matrix, wherein the sub-pixels at least include first subordinate sub-pixels and second subordinate sub-pixels;

the color filter substrate is provided with first common electrodes and second common electrodes configured to form an electrical field with pixel electrodes on the array substrate to control deflection of liquid crystal molecules of the liquid crystal layer, the first subordinate sub-pixel and the second subordinate sub-pixel of a same sub-pixel respectively correspond to different common electrodes, and the common electrodes corresponding to the first subordinate sub-pixel and the second subordinate sub-pixel of the same sub-pixel are respectively connected with different external common voltage signals; and the array substrate is provided with first common electrode lines and second common electrode lines configured to form a storage capacitor between the common electrode lines and the pixel electrodes through an insulating layer therebetween on the array substrate, the first subordinate sub-pixel and the second subordinate sub-pixel of a same sub-pixel respectively correspond to different common electrode lines, and the common electrode lines corresponding to the first subordinate sub-pixel and the second subordinate sub-pixel of the same sub-pixel are electrically connected with the common electrodes corresponding to the first subordinate sub-pixel and the second subordinate sub-pixel of a same sub-pixel, respectively;

wherein the first common electrode lines and the second common electrode lines are periodically arranged in an order of two first common electrode lines and two second common electrode lines, adjacent first subordinate sub-pixel and the second subordinate sub-pixel of different sub-pixels respectively correspond to two adjacent first common electrode lines or respectively correspond to two adjacent second common electrode lines, and the two adjacent first common electrode lines are electrically connected with a same first common electrode, respectively, and the two adjacent common electrode lines are electrically connected with a same second common electrode, respectively.

2. The display device according to claim 1, wherein the first common electrodes are connected with an external first common voltage signal, and the second common electrodes are connected with an external second common voltage signal; and the first common electrode lines are electrically connected with the first common electrodes, and the second common electrode lines are electrically connected with the second common electrodes.

3. The display device according to claim 2, wherein adjacent first and second subordinate sub-pixels of different sub-pixels correspond to a same first common electrode or correspond to a same second common electrode.

4. The display device according to claim 3, wherein adjacent first subordinate sub-pixel and second subordinate sub-pixel of different sub-pixels correspond to a same first common electrode line or correspond to a same second common electrode line.

5. The display device according to claim 3, wherein the two adjacent first common electrode lines are electrically connected through a first connection electrode, and one of the first common electrode lines is electrically connected with the first common electrodes, and the two adjacent second common electrode lines are electrically connected through a second connection electrode, and one of the second common electrode lines is electrically connected with the second common electrodes.

6. The display device according to claim 3, wherein the two adjacent first common electrode lines both are electrically connected with a first signal line through a first connection electrode, the first signal line is electrically connected with the first common electrodes, the two adjacent second common electrode lines both are electrically connected with a second signal line through a second connection electrode, and the second signal line is electrically connected with the second common electrodes.

7. The display device according to claim 1, wherein each row of the sub-pixels includes two rows of the subordinate sub-pixels, the first row of the subordinate sub-pixels includes a plurality of first subordinate sub-pixels, and the second row of the subordinate sub-pixels includes a plurality of second subordinate sub-pixels; and the common electrodes and the common electrode lines respectively on the color filter substrate and the array substrate are parallel to an extending direction of the gate lines, and one row of the subordinate sub-pixels correspond to one common electrode and one common electrode line.

8. The display device according to claim 1, wherein a sealant is provided between the color filter substrate and the array substrate, positions at which common electrode lines and the common electrode lines are connected are located at a side of the sealant facing a pixel region or located inside the sealant.

9. The display device according to claim 1, wherein each common electrode and each common electrode line corresponding to a same subordinate sub-pixel are electrically connected through a conductive gold ball, conductive silver adhesive, or indium tin oxide.

10. The display device according to claim 2, wherein each row of the sub-pixels includes two rows of the subordinate sub-pixels, the first row of the subordinate sub-pixels includes a plurality of first subordinate sub-pixels, and the second row of the subordinate sub-pixels includes a plurality of second subordinate sub-pixels; and the common electrodes and the common electrode lines respectively on the color filter substrate and the array substrate are parallel to an extending direction of the gate lines, and one row of the subordinate sub-pixels correspond to one common electrode and one common electrode line.

11. The display device according to claim 1, wherein each row of the sub-pixels includes two rows of the subordinate sub-pixels, the first row of the subordinate sub-pixels includes a plurality of first subordinate sub-pixels, and the second row of the subordinate sub-pixels includes a plurality of second subordinate sub-pixels; and the common electrodes and the common electrode lines respectively on the color filter substrate and the array substrate are parallel to an extending direction of the gate lines, and one row of the subordinate sub-pixels correspond to one common electrode and one common electrode line.

12. The display device according to claim 2, wherein a sealant is provided between the color filter substrate and the array substrate, positions at which common electrode lines and the common electrode lines are connected are located at a side of the sealant facing a pixel region or located inside the sealant.

13. The display device according to claim 1, wherein a sealant is provided between the color filter substrate and the array substrate, positions at which common electrode lines and the common electrode lines are connected are located at a side of the sealant facing a pixel region or located inside the sealant.

14. The display device according to claim 2, wherein each common electrode and each common electrode line corresponding to a same subordinate sub-pixel are electrically connected through a conductive gold ball, conductive silver adhesive, or indium tin oxide.

* * * * *